United States Patent
Leigeber et al.

(10) Patent No.: US 6,732,961 B2
(45) Date of Patent: May 11, 2004

(54) METHOD OF PRODUCING PLATELETS

(75) Inventors: Horst Leigeber, Oberhaching (DE); Franz-Heinrich Kreuzer, Planegg (DE); Adolf Gurtner, Wildenau (AT); Volker Stanjek, Munich (DE)

(73) Assignee: Consortium fuer elektrochemische Industrie, GmbH, Munich (DE)

( * ) Notice: Subject to any disclaimer, the term of this patent is extended or adjusted under 35 U.S.C. 154(b) by 147 days.

(21) Appl. No.: 10/002,923

(22) Filed: Nov. 15, 2001

(65) Prior Publication Data

US 2002/0086113 A1 Jul. 4, 2002

(30) Foreign Application Priority Data

Nov. 16, 2000 (DE) .......................... 100 56 844
May 23, 2001 (DE) .......................... 101 25 358

(51) Int. Cl.$^7$ .............................................. B02C 19/12
(52) U.S. Cl. .......................... 241/3; 241/24.28; 241/26; 241/30; 241/5
(58) Field of Search .......................... 241/30, 5, 1, 26, 241/301, 24.28, 3

(56) References Cited

U.S. PATENT DOCUMENTS

| | | | |
|---|---|---|---|
| 3,138,475 A | 6/1964 | Schroder et al. | |
| 5,362,315 A | 11/1994 | Muller-Rees et al. | |
| 5,856,997 A | 1/1999 | Mochizuki et al. | |
| 6,132,504 A | 10/2000 | Kuntz et al. | |

FOREIGN PATENT DOCUMENTS

| | | |
|---|---|---|
| DE | 42 40 743 | 6/1994 |
| DE | 196 18 563 A1 | 11/1997 |
| DE | 196 18 566 A1 | 11/1997 |
| DE | 197 07 805 A1 | 9/1998 |
| DE | 197 57 699 | 6/1999 |
| DE | 199 17 067 | 10/2000 |
| EP | 0 793 693 B1 | 4/1999 |
| WO | WO 93/08237 | 4/1993 |
| WO | WO 98/38255 | 9/1998 |

OTHER PUBLICATIONS

English Derwent Abstract Corresponding to DE 197 57 699 A [AN 1999—205 158 [17]].
English Derwent Abstract Corresponding To WO 9838255 [AN 1998–468276 [41]].
English Derwent Abstract Corresponding To DE 199 17 067 A1.
English Derwent Abstract Corresponding To DE 196 18 566.
English Derwent Abstract Corresponding To DE 196 18 563.
English Derwent Abstract Corresponding To DE 197 07 805.
English Derwent Abstract Corresponding To DE 42 40 743.
English Derwent Abstract Corresponding To EP 793 693.
D.J. Broer, G.N. Mol, Challa, Makromol. Chem., 1991, 192, 59.
De Visser et al., J. Polym. Sci. A–1, vol. 9, 1983 (1971).

*Primary Examiner*—Mark Rosenbaum
(74) *Attorney, Agent, or Firm*—Brooks Kushman P.C.

(57) ABSTRACT

The invention relates to a method of producing platelets, wherein a material to be processed into platelets is applied in a flowable or gaseous state to a substrate, consolidated, removed from the substrate, and subjected to a crushing or grinding process, wherein the material is applied to the substrate in succeeding layers such that after application, a lamina pack is present which, in cross section perpendicular to its surface, has individual laminae of a thickness of between 0.2–1000 μm, and said lamina pack, having been stripped from the substrate, is treated in such a way that the material disintegrates into individual laminae and the individual laminae are reduced in size to a particle size of 0.5–10000 μm.

17 Claims, 7 Drawing Sheets

METHOD OF PRODUCING PLATELETS

BACKGROUND OF THE INVENTION

1. Field of the Invention

The invention relates to a method of producing platelets having a thickness of 0.2–1000 $\mu$m and a diameter of 0.5–10,000 $\mu$m.

2. Background Art

A variety of platelets occur in nature as flakes, nacre or mica platelets and are used either as such or in surface-modified form as special-effect pigments. In addition, synthetic special-effect pigments are known which, for example, comprise thin platelets of cholesteric liquid crystals. Furthermore, such platelets are widely used in other applications, for example as rheological additives.

WO 93/08237, DE 196 18 563 A1, DE 196 18 566 A1 and DE 197 07 805 A1 describes the preparation of interference pigments which consist of high and low refractive index, optionally colored or fully absorbing laminae and of metal laminae. These interference pigments are prepared by one or a plurality of interference pigment materials being applied to a substrate material, the thusly formed layer then being stripped from the substrate. This layer must not, even when composed of individual sublayers, separate into its component sublayers during the stripping process and subsequent processing steps, since this would cause the characteristic properties of the interference pigment to be lost. A sublayer is therefore an integral component of a platelet produced according to the prior art.

If the materials for preparing the layer have low mechanical strength, the material layer cannot be pulled off the substrate material over its entire area without tearing, but instead has to be subjected to an abrasive process. Particularly with thin layers below 10 $\mu$m, this process step is cost-intensive and entails wear problems relating to the substrate material, particularly if a terephthalate sheet (DE 196 18 566 A1, DE 197 07 805 A1), commonly used as a substrate material, is involved. To avoid this problem it is known to apply release agents to the substrate material, before the materials forming the interference pigment are applied. This procedure is eminently suitable if the interference pigment is formed by brittle materials. Considerable problems arise, however, if materials having high flexural elongations and low ultimate tensile strength are involved. On the one hand, it is then extremely difficult to convert these layered materials into fragments which can be removed from the substrate by means of compressed air or a suction operation, and on the other hand they do not have sufficient mechanical strength to be stripped undamaged as a film from the substrate.

U.S. Pat. No. 5,364,557 discloses the preparation of thin cholesteric platelets by applying a cholesteric layer to a substrate material, e.g. onto a sheet by means of an applicator mechanism consisting of a doctor blade or a roll applicator mechanism. In the case of fusible materials, application takes place above the melting temperature or glass transition temperature of the material. Then the material is removed from the substrate at a temperature below the melting temperature or glass transition temperature by means of an air jet which optionally includes an abrasive powder, or alternatively, by means of a scraper. A special embodiment described is the transfer to a further substrate material. Also disclosed is the generation of layers consisting of substances having different properties. Described, inter alia, are bilayers consisting of left- and right-helical material which, in the course of size reduction process, afford platelets which consist both of a left- and of a right-helical lamina and do not disintegrate into further laminae during the size reduction process.

All the procedures disclosed in U.S. Pat. No. 5,364,557 lead to a single lamina, which may be composed of sub-laminae and which, upon crushing, afford platelets which are of the same thickness as the layer subjected to the grinding process.

DE 42 40 743, corresponding to U.S. Pat. No. 5,362,315, likewise discloses the preparation of crosslinked cholesteric platelets via single layers.

According to EP 07 93 693, the production of crosslinked cholesteric platelets is effected by printing cholesteric material onto a substrate, by crosslinking and by subsequent removal of the printed, crosslinked material. This process, too, is based on a single layer which corresponds to the cholesteric platelet ultimately obtained.

The usefulness of all the abovementioned methods is dependent on how easy it is to strip the film which is either crosslinked or below its glass transition temperature from the substrate used. The firmer the adhesion of the cholesteric film to the substrate, the larger the mechanical stress to which the substrate must be subjected when the cholesteric layer is stripped. This results in high wear of the substrate material and consequently in increased production costs for the cholesteric films. Problems occur in particularly drastic form if layers having a thickness of less than 10 $\mu$m, consisting of a non-brittle material, have to be stripped.

SUMMARY OF THE INVENTION

It is therefore an object of the invention to provide a method which enables platelets having a thickness of 0.2–1000 $\mu$m and a diameter of 0.5–10,000 $\mu$m to be produced without the abovementioned problems even from materials having high elongation at break and low ultimate tensile strength.

This object is achieved by a method wherein a material to be processed into platelets is applied in a flowable or gaseous state to a substrate, is consolidated, and removed from the substrate and subjected to a crushing or grinding process, wherein the material is applied to the substrate in succeeding layers, such that after its application, a lamina pack is present, which in its cross section perpendicular to its surface, has a plurality of individual laminae of a thickness of between 0.2–1000 $\mu$m, and the lamina pack, having been stripped from the substrate, is treated in such a way that the material disintegrates into individual laminae and the individual laminae are reduced in size to a particle size of 0.5–10,000 $\mu$m.

BRIEF DESCRIPTION OF THE DRAWINGS

FIG. 9 is a scanning electron micrograph of a lamina pack of Example 3a.

FIG. 10 is a scanning electron micrograph of pigments from the comminuted lamina pack of FIG. 9, in accordance with Example 3a.

DETAILED DESCRIPTION OF THE PREFERRED EMBODIMENT(S)

A lamina pack is preferably obtained by first applying nonconsolidated material to be processed into platelets onto a substrate in the conventional manner and then consolidated, after which more nonconsolidated material to be processed into the platelets is applied subsequently over the previously applied and consolidated material, and this subsequently applied material is also consolidated, without the individual consolidated layers fusing together or blocking. Process steps suitable for this purpose include, for example, the application and subsequent polymerization and/or crosslinking of polymerizable and/or crosslinkable materials to an already polymerized and/or crosslinked layer, or the application of a melt of material to a solidified, cold, previously applied material.

Optionally, the lamina pack is produced with the use of a release agent. This process involves applying a release agent to a consolidated material layer before a nonconsolidated material layer is applied. The application of the release agent can be performed in between each individual layer or after a specific number of layers have been applied and consolidated. To produce multilaminar platelets, the release agent is applied after the desired number of layers (sublayers) have been applied, and which, after size reduction, form a multilaminar platelet. For the purpose of the present invention, a multilaminar sheet which does not disintegrate into individual laminae (sublaminae) while being stripped off the substrate and during the grinding process, is an individual lamina. It is therefore entirely possible, as is also known from the prior art, for an individual lamina for the purpose of the present invention to consist of a plurality of sublaminae permanently bonded together.

The lamina pack is preferably prepared by repeating the application of the material to be processed to form an individual lamina, followed by consolidation, two or more times. Preferably, a lamina pack consists of more than 6 individual laminae, more preferably more than 10 individual laminae.

After the pack consisting of at least two individual laminae has been built up, it is removed from the substrate, a first lamina of the material optionally remaining behind on the substrate, and is then passed to a crushing and/or grinding mechanism.

Suitable as a substrate onto which the first layer of the material to be processed into platelets is applied is any material which is solid at the consolidation temperature of the material to be applied. Examples of these include metals such as iron, steel, alloy steels, brass, chromium, copper or plastics such as saturated polyesters (PET), polyethylene (PE), polypropylene (PP), polystyrene (PS), crosslinked unsaturated polyesters, polytetrafluoroethylene (Teflon), polyimides and polyamides, and also inorganic oxidic and nonoxidic materials such as porcelain, silicon carbide, tungsten carbide, boron carbide, silicon nitride, mixed ceramics, granite and glass or combinations of these materials in the form of coated materials or composite materials produced therefrom.

Substrates can be selected from plate-shaped, cylindrical, tubular or strip-shaped bodies. Their surfaces can be rough, ground, polished, surface-treated and/or provided with a release layer. They are preferably cylindrical bodies or bodies which are optionally of conical or parabolic shape.

Materials which can be used in the method according to the invention are crosslinkable materials or substances which can be converted from the liquid into a solid phase, i.e. by solidification of a melt, by evaporation of a solvent, by crystallization, or by a polymerization and/or crosslinking reaction.

Examples of such materials are saturated and unsaturated polyesters, epoxy resins, vinyl esters, vinyl ethers, polyurethanes, silanes, siloxanes, silanolates, water glass, silicic acid esters, liquid-crystalline, polymerizable or crosslinkable aromatic, cycloaliphatic or heterocyclic compounds such as epoxy resins having the amino, hydroxy or anhydride components, vinyl esters, vinyl ethers, isocyanates as such or with the corresponding HO-components in monomeric or oligomeric form, silanes or siloxanes. Also to be mentioned are film-forming dispersions and resin solutions which comprise crosslinkable or non-crosslinkable resins. This list is exemplary and not limiting.

Preferably, the non-consolidated materials are polymerizable and/or crosslinkable, liquid-crystalline, nematic, smectic, chiral nematic and chiral smectic materials. Preferably, the materials have a cholesteric phase.

The materials can be used in pure form or in combination with other substances such as, for example, auxiliaries or "active ingredients". Examples of auxiliaries include fillers, dyes, pigments or initiators for free-radical or ionic polymerizations, for polyadditions, condensations, or for hydrosilylations.

Active ingredients can be present in dissolved form or as a second phase in the material. Examples include pharmaceuticals, herbicides or pesticides.

The materials can also include liquids in dispersed form, e.g. low molecular weight liquid-crystalline substances which can be switched within the platelets in the usual way, e.g. by the application of electric fields.

The second phase can either be present in the matrix of the material to be used prior to implementation of the method according to the invention, or can be formed by phase separation in the course of the method according to the invention.

In addition, film-forming dispersions, suspensions, powder coatings or comparable systems, and also substances which can be applied by sputtering or vapor deposition can be used as starting materials in the method according to the invention. Examples of these include polymerizable, polyaddable, hydrosilylable, polycondensable, or crosslinkable substances, fusible resins, thermoplastics, solutions which can be converted into films by evaporation of solvents, suspensions and mixtures which can be converted into two-phase systems by polymerization, which optionally contain auxiliaries such as photoinitiators, peroxides, UV absorbers, dyes or pigments.

The lamina pack can be built up using one or more of the abovementioned materials. A prerequisite for successful implementation of the method according to the invention is that the mechanical strength of the lamina pack parallel to the course of the laminae is greater than the mechanical strength perpendicular to the laminae, i.e. the interlaminar strength.

A lamina pack can be built up from the abovementioned materials with or without the use of a release agent. Preferred as release agents are compounds such as silicones, but also surfactants, polyethers, poly(vinyl alcohol) (PVA), highly disperse silicic acid, talc, Teflon powder, graphite, molybdenum sulfide, powdered mica and metal platelets (e.g. Al or brass) can be used as well.

The release characteristics of the release agent can be effective immediately after the lamina pack has been removed from the substrate or alternatively can become effective, for example in the case of a lamina pack of inorganic material, in a subsequent calcination step. This can take place, for example in the case of a lamina pack containing organic release layers, by calcination in an oxidizing atmosphere above 150° C. or by blowing a release layer which, for example, gives off water, $CO_2$ or $N_2$.

The same effect achieved by application of a release agent between the individual layers can be achieved with crosslinkable materials if the layers of crosslinkable materials, whose separation is initially undesirable, are only weakly crosslinked, whereas layers which are not to be separated are strongly crosslinked.

Application of the materials can be effected by various methods. By way of example, application options including rolling, blade-coating, spraying in liquid form with or without solvent, or spraying in the form of powders according to the known powder technologies, vapor deposition, and sputtering, may be mentioned. Application can be effected by means of one or more applicator mechanisms, with the requirement that the material or materials must each time, between the applicator mechanisms, be converted into the desired solid form, when separation is desired. Depending on the material, this is done in known ways by drying, polymerization, crosslinking or cooling or combinations of these methods. Optionally, the lamina packs can be produced with the use of smoothing elements.

If the materials to be processed into platelets are liquid-crystalline materials, the build-up of the laminae preferably takes place in the presence of auxiliaries which align liquid crystals or in the presence of electric or magnetic fields. Suitable procedures are known from the prior art. With such materials, the layer pack is preferably built up without the use of a release agent.

After a layer sequence of the desired extent has been built up, the lamina pack is stripped from the substrate and subjected to a size reduction process. In so doing, the process of stripping the lamina pack can also take the form of removing laminae from the side opposite the applicator mechanism. The removal preferably takes place continuously. Size reduction can take place, for example, in an edge mill, a ball mill, a pin mill or an airjet mill, and the material can then be classified, i.e. by size.

The method according to the invention can also be implemented in such a way that the materials having different characteristics are applied on top of one another immediately after one another, with the proviso that these double or multiple laminae bonded firmly together represent the individual laminae of the lamina pack being formed which, during the grinding process, afford the desired platelets having the desired laminar sequence.

The method according to the invention therefore also allows the accomplishment of platelets having a laminar structure. Thus, for example, various material combinations can be produced, e.g. AB, ABA, ABC etc. (A=material 1, B=material 2, C=material 3). For example, it is possible to obtain double, three-fold or n-fold layers of cholesteric liquid crystals each having different reflected wavelengths or different helicity. Combinations of cholesteric laminae with nematic laminae of planar alignment which reflect plane polarized light, or combinations of cholesteric layers with homeotropically aligned nematic or smectic layers are likewise possible.

Below, further combinations of properties in the platelets which can be accomplished by the method according to the invention are mentioned by way of example, but not of limitation: high/low dielectric constants; high/low electric dipole moment; high/low electrical or optical polarizability; high/low refractive index; birefringent/isotropic; transparent/scattering; transparent/absorbing; scattering/absorbing; hydrophilic/hydrophobic; lipophilic/lipophobic; electrically conductive/nonconductive; high/low electrical resistance; ionic/neutral; anionic/cationic; magnetic/nonmagnetic; magnetizable/nonmagnetizable; swellable/nonswellable; swellable only in organic solvents/swellable only in water.

The platelets produced according to the invention can be subjected to further process steps, for example coating with metals and metal oxides.

A variation on the method according to the invention can be implemented, for example, by a modification of the method described in DE 42 40 743 A1. According to DE 42 40 743 A1, the crosslinking reaction of the material to be processed into platelets is carried out between two sheets, a substrate sheet and a cover sheet. This method is modified into the method according to the invention by freeing the first layer (located between substrate sheet and cover sheet) from the cover sheet, and by the layer remaining on the substrate sheet being subjected to one or more further coating steps similar to the coating of the substrate. A lamina pack thus produced, in the form of a lamina stack, can be stripped much more readily from the substrate than an individual lamina. In this variation of the method according to the invention, the substrate sheet is employed without a release agent or release layer.

The foregoing variation on the method according to the invention operates batchwise, both in terms of applying the material and in terms of obtaining the lamina pack. It can, however, be converted into a continuous process by using continuous substrates and a plurality of successive application and curing units which result in the build up of multiple layers, followed by a stripping unit.

Figure 1:
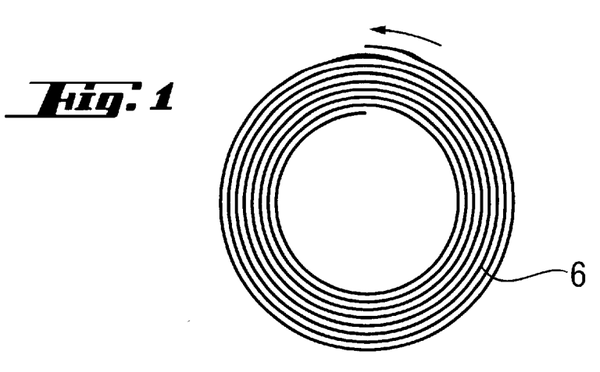
FIG. 1 schematically illustrates one embodiment of forming a lamina pack.
Figure 2:
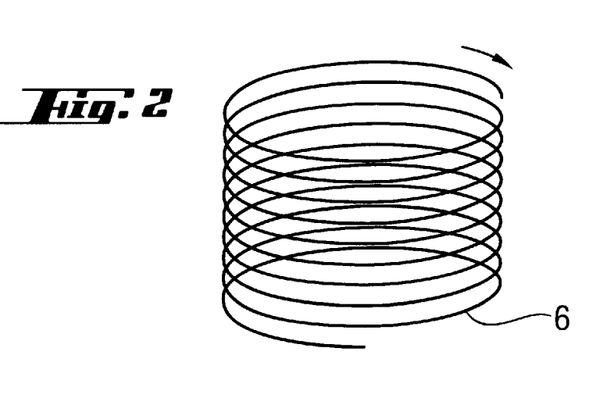
FIG. 2 schematically illustrates a second embodiment of forming a lamina pack.
Figure 3:
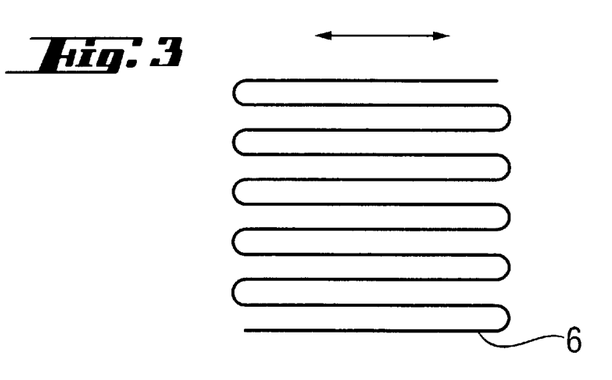
FIG. 3 schematically illustrates a third embodiment of forming a lamina pack.

FIGS. 1 to 3 schematically show, by way of example, further ways of applying material to build up a lamina pack from which platelets can be produced, the material being applied continuously or batchwise. The arrows indicate the application direction.

Figure 4:
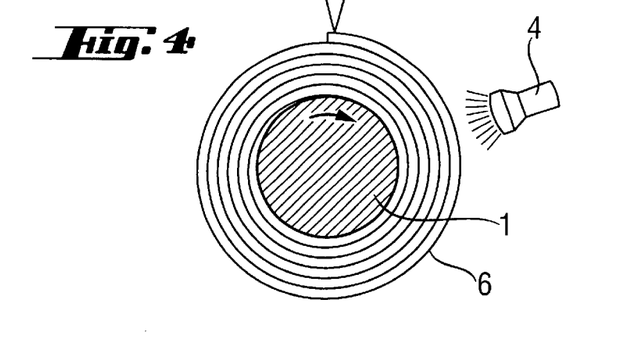
FIGS. 4, 4a, and 4b, illustrate variants of the embodiment of FIG. 1.
Figure 4A:
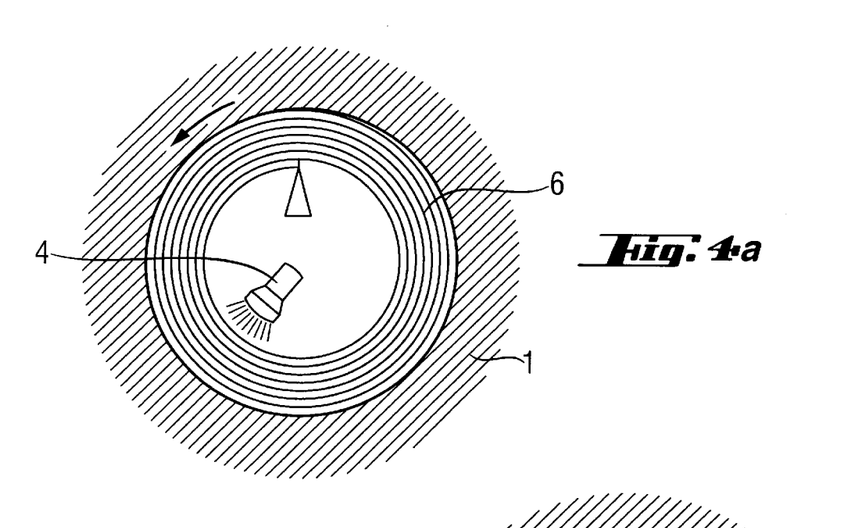
Figure 4B:
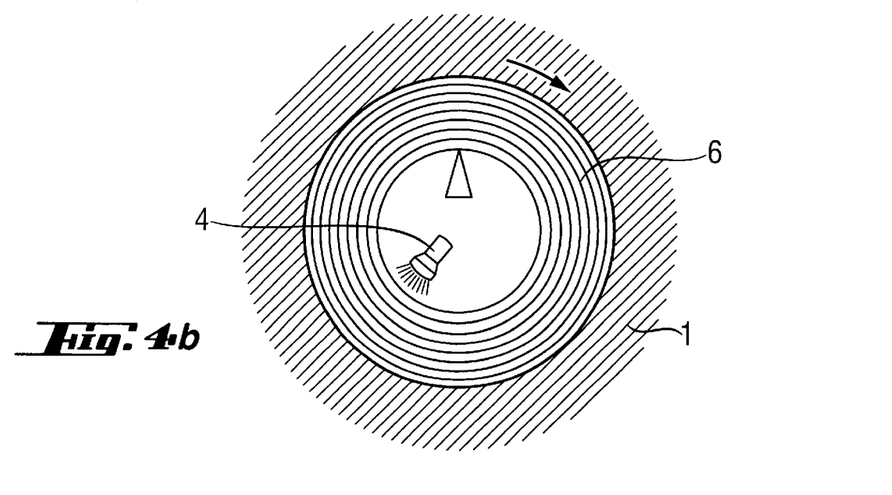

Application of the material according to FIG. 1 is effected, for example, on the outside of a rotating cylinder as a substrate, by means of an applicator mechanism. This process is also shown schematically in FIG. 4. Similarly, application to the inside of a cylinder as the substrate is possible as shown in FIG. 4a. If the revolution period of the unconsolidated material on the cylinder is greater than the time required for consolidation, consolidation can take place continuously, producing a roll-shaped lamina pack. If the revolution period of the unconsolidated material on the cylinder is less than the consolidation time, the material is applied batchwise, consolidation taking place after application of a cylinder circumference of unconsolidated material, the next application of a cylinder circumference of unconsolidated material taking place after consolidation, etc. Rather than a roll-shaped lamina pack, this produces a lamina pack of annular structure, as shown in FIG. 4b. The application of the material to the inside of a cylinder can take place in the above described manner, but can alternatively take place via a spray operation, followed by the material being leveled by centrifugal acceleration.

Figure 5:
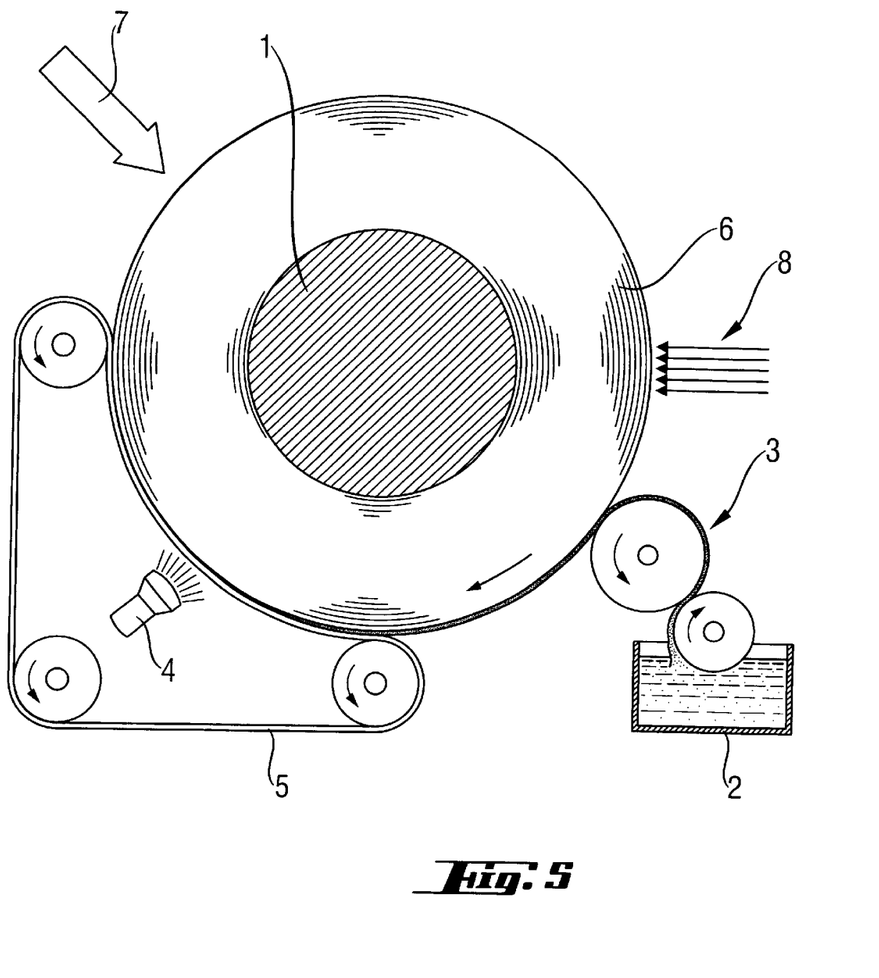
FIG. 5 illustrates an apparatus useful for producing a lamina pack on a cylindrical substrate employing UV curing radiation.

The design of an apparatus suitable for producing a lamina pack in the form of a roll on a cylinder of material crosslinkable by means of UV radiation is shown in FIG. 5. The material is applied from a material reservoir (2) by means of a roll applicator mechanism (3) to a rotating cylinder (1), is smoothed by means of a sheet (5) sufficiently transparent for UV radiation required for polymerization, and is crosslinked by means of UV radiation (4). After crosslinking a release aid can be applied or, in the case of liquid-crystalline materials, an alignment aid (7) which is pretreated in a subsequent pass, for example by rubbing (8). The alignment aid (7) used can, for example, be in the form of photochemically generated alignment layers.

The sheet (5) can optionally be surface-treated, for example carrying a silicone layer. Apart from its smoothing function, the sheet (5) is responsible for keeping atmospheric oxygen, which may have an adverse effect on crosslinking, away from the surface to be crosslinked. This is not necessary if the apparatus is operated under inert gas. Once the desired number of laminae has been achieved, the spiral-structure lamina pack (6) is removed from the cylindrical core (1) and passed to a grinding apparatus.

Figure 6:
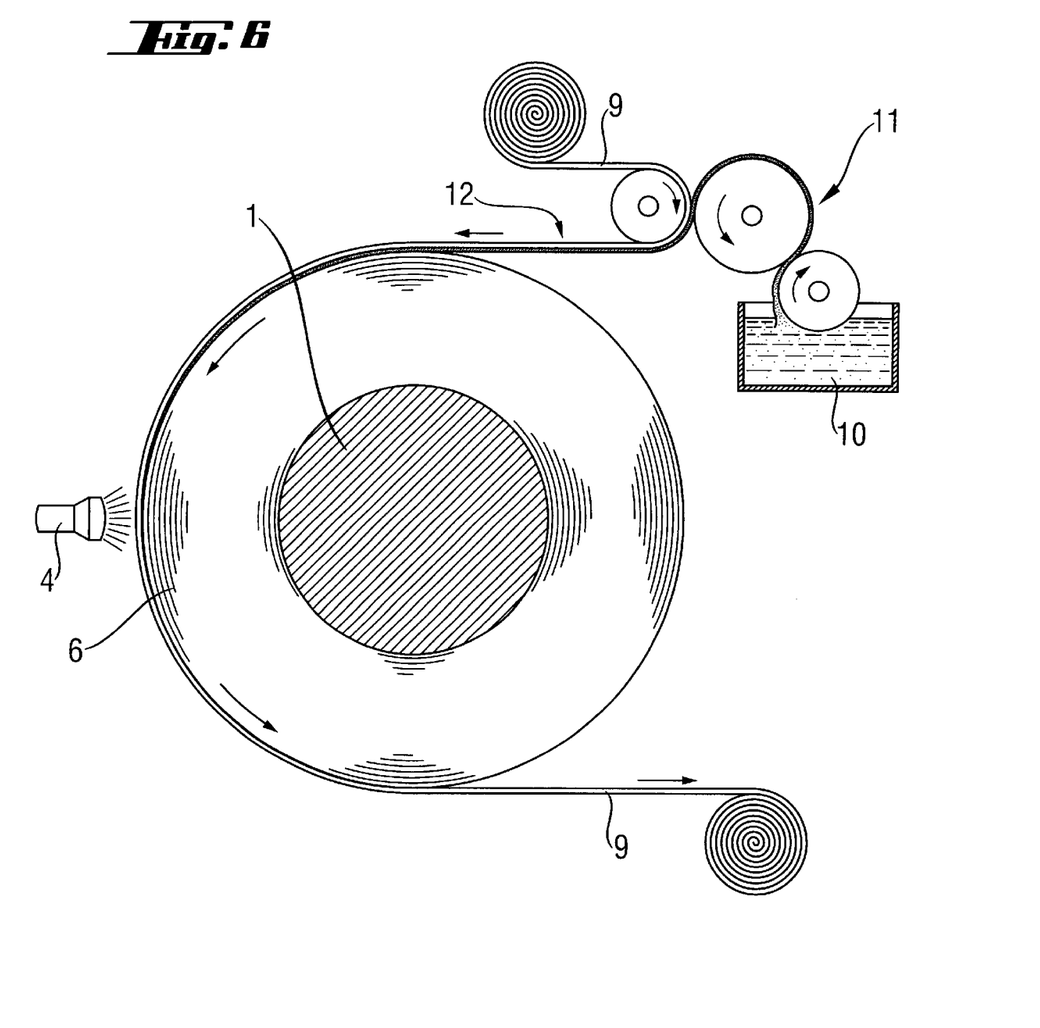
FIG. 6 illustrates the use of a flexible substrate in preparing lamina packs.

A further variation on the method is shown in FIG. 6. A flexible substrate (9) is coated by means of methods such as those known from the prior art, e.g. from a material reservoir (10), and using an applicator mechanism (11), with a radiation- (UV-, electron beam-)crosslinkable material. The coated flexible substrate (12) continuously transfers the material to a rotating cylindrical core (1). There the material is UV-crosslinked or is cured by other means such as an electron beam (4). This continuous coating process results in a lamina pack in the form of a roll. The substrate (9) from which the coating has been removed can either be continuously reused immediately as an endless belt or, as shown in FIG. 6, run from one roll to the next.

Because of the stripping step, the processes heretofore described are batch or semi-continuous processes. If the apparatus is of sufficient size, however, the process can also be made continuous via the use of a plurality of successive application and curing units resulting in multiple layers being built up, followed by a stripping unit.

The method of application of the material to a substrate as shown in FIG. 2 or 3 likewise very readily results in continuous processes.

According to FIG. 2, a lamina pack is built up in the form of a helix by an applicator mechanism moving above a substrate on a circular orbit and by the applied material being transformed continuously into the solid state. If the applicator mechanism used is a roll applicator mechanism, for example, this is expediently of conical shape, to ensure uniform application of the layer-forming material. If the circular orbit of the applicator mechanism is maintained at a constant working height, the helical lamina pack grows downward. Without interrupting the continuous growth of the lamina pack it is possible, once the substrate has been removed, for layered material to be removed continuously or batchwise at the desired distance from the working plane and to be fed to a grinding process.

FIG. 3 schematically shows the structure of a lamina pack, comparable with a stack of continuous paper. This folded-leaf structure is obtained if an applicator mechanism moves forward and subsequently backward in a plane above a substrate and the applied material is continuously converted into the solid state. If the plane of motion is maintained at a constant working height, the folded lamina pack grows downward. Without interrupting the continuous growth of the lamina pack it is possible, once the substrate has been removed, for layered material to be removed continuously or batchwise at the desired distance from the working plane and to be fed to a grinding process.

The grinding process proceeds as known from the prior art for producing platelets of the abovementioned size.

The platelets obtained via the method according to the invention can be used as pigments, special-effect pigments, substrates for interference layers, rheological additives, lubricants, thermal shields, polarizers, electrically switchable displays, flame retardants, electroviscous fluids and active ingredient excipients.

The following examples serve to describe the invention in more detail.

EXAMPLE 1

Producing Liquid-Crystalline Platelets Having Cholesteric Structure (Pigments) from Multiple Layers Using a Siliconized Cover Sheet EXAMPLE 1a From a Lamina Pack Having Two Layers According to the method described in Example 9 of the German Patent Application DE 199 17 067, two mixtures are prepared of crosslinkable liquid-crystalline substances having a chiral phase (LC mixtures). In so doing, the color of the first LC mixture (mixture 1) is adjusted in such a way via a suitable concentration of the chiral dopant, that a liquid-crystal film (LC film) consisting of only one layer is colored red when viewed orthogonally from above. The color of the second LC mixture (mixture 2) in contrast is adjusted in such a way that an LC film prepared in a similar manner is colored green when viewed orthogonally from above.

A liquid-crystal film is prepared from the first LC mixture by applying said mixture at 100° C. by means of knife application with a layer thickness of about 6 µm to a PET sheet (thickness=50 µm, type Hostaphan RN 50, obtainable from Pütz Folien, Taunusstein-Wehen). Laminated on top of the layer thus obtained is a cover sheet which, on the side facing the LC layer, is provided with a crosslinked silicone layer having a thickness of about 2 µm. In the process, the LC mixture aligns to form a strongly reflective, cholesteric structure. The silicone layer consists of three-dimensionally crosslinked silicone (100 parts Dehesive 920, 1 part Adhesion Promoter HF 86, 2.5 parts Crosslinker V24 and 1 part Catalyst OL, obtainable from Wacker Chemie GmbH, Munich). Next, the LC layer is fully cured by means of UV light, using a $UV_A$ dose of about 300–600 mJ/cm². A temperature of 100° C. is maintained during the entire process. The LC film thus obtained exhibits a red color when viewed orthogonally from above.

After the cover sheet is removed, the $2^{nd}$ LC mixture (mixture 2) is applied on top of said first LC layer, again at 100° C. by means of knife application. Repeating all the abovementioned process steps thus affords a two-layer system having an overall layer thickness of about 12 µm (i.e. 6 µm per individual layer) which, when viewed orthogonally from above, has a golden color (color addition of red and green).

After the cover sheet has been removed, the LC double layer together with the substrate sheet is broken up by being deflected across a breaking edge (deflection radius 0.4 mm). The raw chips thus formed are separated from the substrate sheet by suction. The LC double layers having a thickness of 12 µm can thus be stripped in their entirety off the support sheet without any problems. Then the raw chips are reduced in size in an ultra-centrifugal mill of type ZM 100 from Retsch, Haan, with a fitted screen <80 µm to produce pigments.

Microscopic study of the pigments obtained proves that the LC double layers have completely separated during the grinding process. Thus the pigments, without exception, exhibit either a red or a green color, depending on the layer of origin. Two-layered pigments, which can be recognized by the golden color, are not present even in very large pigment samples (>>10000 individual platelets).

EXAMPLE 1b

The same procedure is followed as in Example 1a, except that only one LC mixture (mixture 2, green, from Example 1a) is used.

Figure 7:
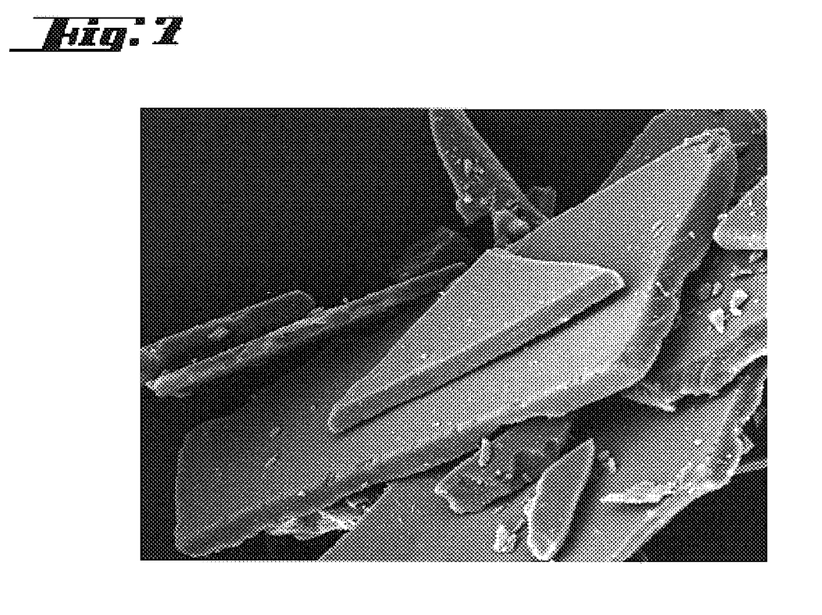
FIG. 7 is an electron micrograph of the pigments produced in Example 1b.

Electron micrographs (FIG. 7) show that as in Example 1a, only single-layer platelets having a thickness of about 6 µm are obtained.

EXAMPLE 1c

The same procedure is followed as in Example 1b, except that a lamina pack is built up from four layers, individual layers of the pack having a thickness of 4–5 µm, resulting in an overall thickness of about 18 µm. Owing to the increased overall thickness, the four-layer lamina pack can be stripped off the substrate sheet even more easily than the two-layer lamina pack in the previous examples. Electron micrographs of the ground pigments show that as in Examples 1a and 1b, the platelets consist of only one layer.

EXAMPLE 1d

The same procedure is followed as in Example 1b, except that an LC mixture is used which consists of 64 g of hydroquinone bis-[4-(4-acryloylbutoxy)-benzoate] (obtainable in accordance with D. J. Broer; G. N. Mol; and G. Challa, *Makromol. Chem.* 1991, 192, 59), 36 g of cholesterol methacrylate (obtainable in accordance with De Visser et al., J. Polym. Sci. A 1(9), 1983 (1971), 1.00 g of photoinitiator Irgacure® 819 and 0.20 g of 2,6-di-t-butyl-4-(dimethylaminomethylene)-phenol (Ethanox® 703, Ethyl Corp., Baton Rouge, La. 70801). This mixture is homogenized by means of a precision glass stirrer at an oil bath temperature of 150° C. until a clear solution is formed, and is then processed further in accordance with the process described in Example 1a.

After the grinding process, green pigments are obtained. Electron micrographs show that these pigments, as in Example 1a, are exclusively single-layer platelets having a layer thickness of about 6 µm.

EXAMPLE 1e

The same procedure is followed as in Example 1b, except that an LC mixture is used which consists of 82.6 g of hydroquinone bis-[4-(4-acryloylbutoxy)-benzoate] (obtainable in accordance with D. J. Broer; G. N. Mol; and G. Challa, *Makromol. Chem.* 1991, 192, 59), 17.4 g of 2,5-bis-[4-(acryloyloxy)benzoyl]-isomannide (obtainable in accordance with the method described in Example 4 of patent application DE 199 17 067, an equivalent amount of isomannide being used as the starting material instead of the isosorbide, all the other reaction parameters remaining unchanged, 1.00 g of photoinitiator Irgacure® 819 and 0.20 g of 2,6-di-t-butyl-4-(dimethylaminomethylene)-phenol (Ethanox® 703, Ethyl Corp., Baton Rouge, La. 70801) being used. This mixture is homogenized by means of a precision glass stirrer at an oil bath temperature of 150° C. until a clear solution is formed, and is then processed further in accordance with the process described in Example 1a.

After the grinding process, green pigments are obtained. Electron micrographs show that these pigments, as in Example 1a, are exclusively single-layer platelets having a layer thickness of about 6 µm.

EXAMPLE 2

Figure 8:
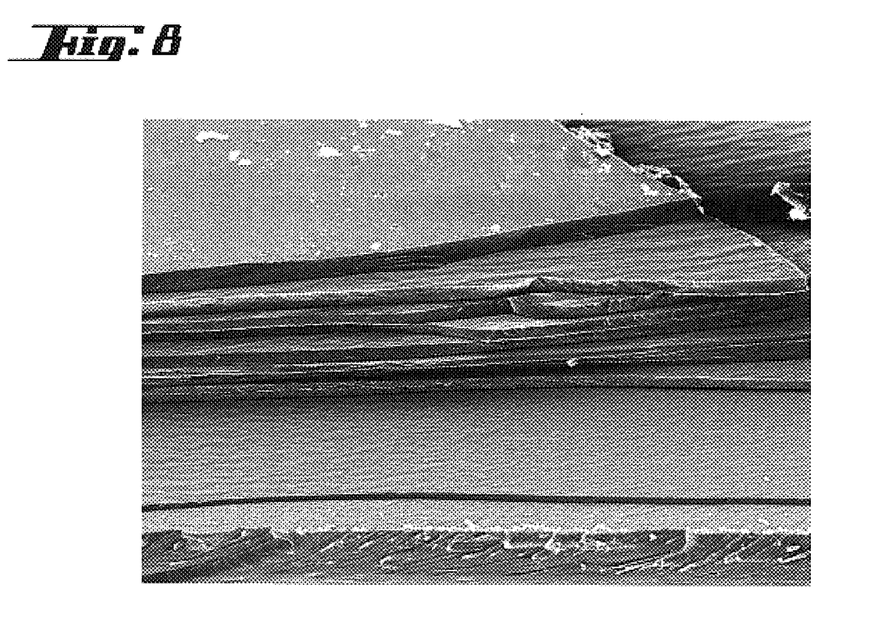
FIG. 8 is a scanning electron micrograph of a lamina pack produced in Example 2.

Producing Platelets Having a Cholesteric Structure (Pigments) from a Lamina Pack of 10 Laminae Without the Use of a Cover Sheet Two crosslinkable, liquid-crystalline materials having a chiral phase, corresponding to DE 199 17 067.3, Example 9, and according to DE 199 17 067.3, Example 10, are alternately applied as layers to a 20 cm×20 cm glass plate with the aid of a knife. This is done on a hotplate at a temperature of 110° C. Each layer, immediately after blade-coating, is crosslinked in a chamber filled with nitrogen by means of a UV hand lamp (uvhand 250, from Hönle, Martinsried). The lamina pack is stripped off the glass substrate at 20° C. The scanning electron micrograph (FIG. 8) shows a lamina pack consisting of 10 layers having layer thicknesses of from 4 to 10 µm. The lamina pack is subjected to size reduction in a manner similar to Example 1a. Visible in the microscope are platelets of green and red reflected color. Scanning electron micrographs of these ground particles show that only particles consisting of just one layer are present.

EXAMPLE 3a

Figure 9:
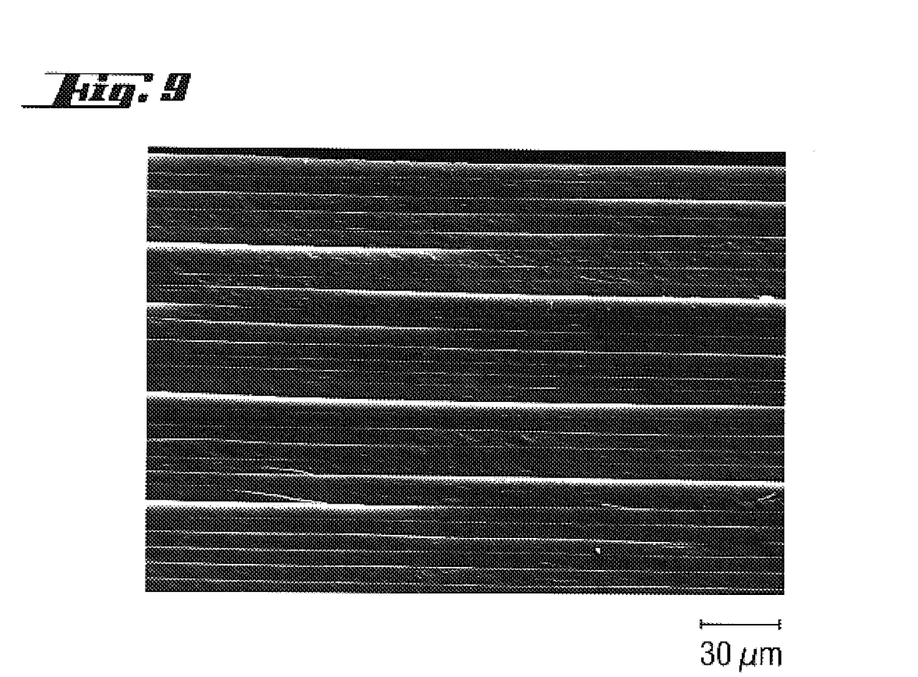
Figure 10:
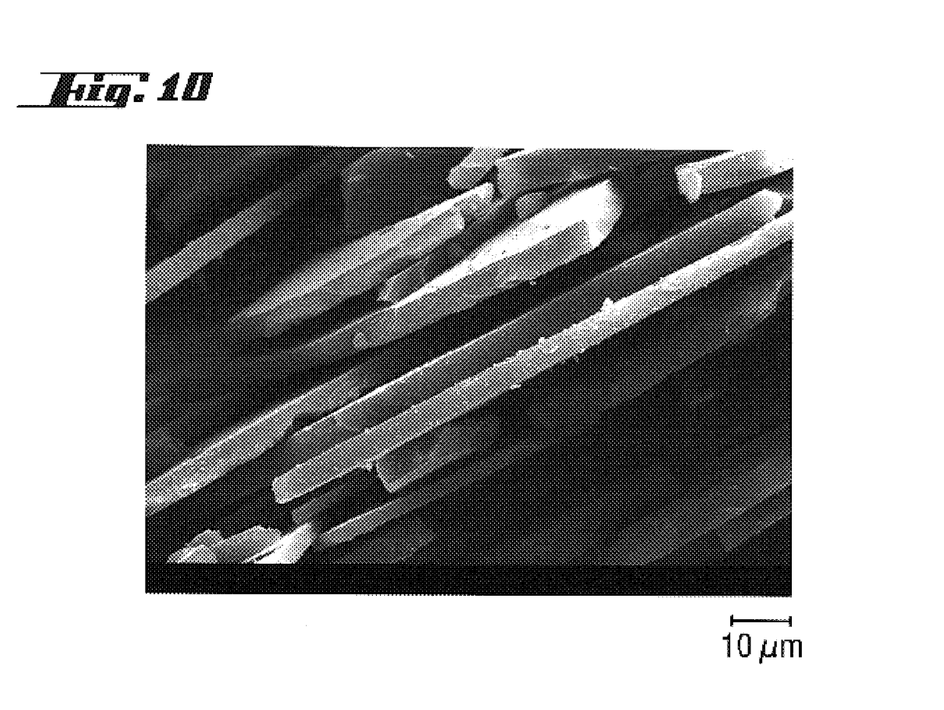

Producing Platelets Having Cholesteric Structure (Pigments) from a Lamina Pack Having 148 Layers Using a Siliconized Cover Sheet A crosslinkable, liquid-crystalline material (LC material) having a chiral phase in accordance with DE 199 17 067.3, Example 10, is processed with the aid of an apparatus similar to that of FIG. 5, but without the elements 7 and 8. A knife (3) is used to apply the material to a rotating hard-chromium roller (1). Knife (3) and roller (1) are heated. The temperature is about 100° C. The spacing between knife edge and roller is set to 5 µm and an LC film having a thickness of 5 µm is applied by blade-coating. Used as the cover sheet for smoothing the material (5) is a siliconized sheet similar to that in Example 1a. Crosslinking is carried out by means of a $UV_A$ lamp (4) (600 mJ/cm$^2$ in the $UV_A$ region). After each rotation of the roller, the knife spacing is increased by 5 µm, so that a further 5 µm layer can be applied to the existing LC layer. This coating operation is performed 148 times, resulting in a multilayer lamina pack of uniform color. The roll perimeter rotates with a velocity of 10 cm/sec. The cylindrical lamina pack consisting of 148 layers having thicknesses of 5 µm is incised parallel to the roll axis and can be lifted off as a thick, free-standing lamina pack. The lamina pack is cut into narrow strips by a paper cutter and is subjected to size reduction by means of an ultra-centrifugal mill of type ZM 100 from Retsch, Haan, fitted with a screen <80 µm, to produce pigments. Visual assessment in a microscope shows platelet-shaped particles. Scanning electron micrographs (FIG. 9, detail from the lamina pack and FIG. 10, bed of the grinding stock) show uniform thicknesses of 5 μm. Multilayer particles could not be observed. The spectrophotometric determination of the reflectance band yields uniform values for the individual pigment particles. This determination was carried out by means of a Zeiss microscope spectrometer MPM 400.

Figure 11:
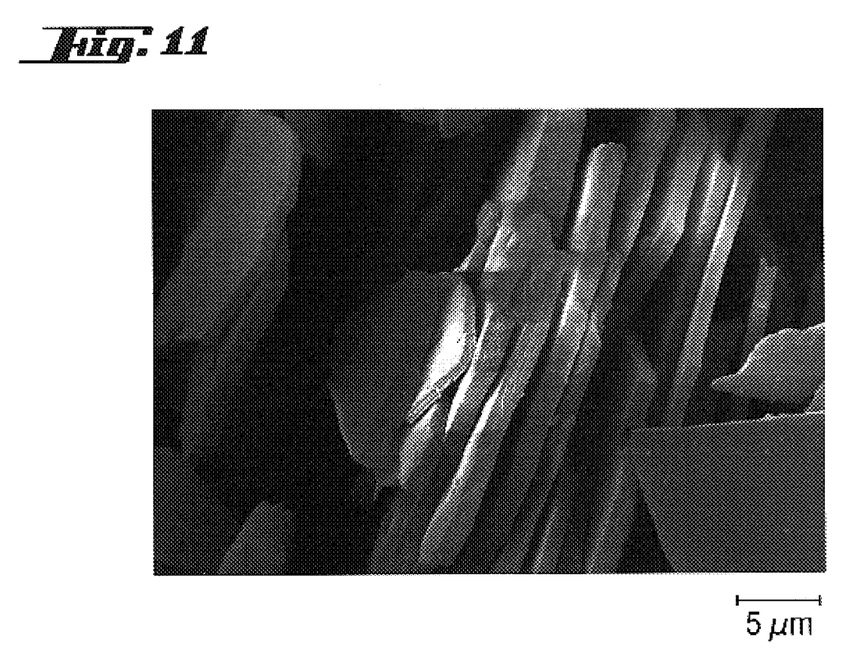
FIG. 11 is a scanning electron micrograph of platelets prepared from a 1508 layer lamina pack in accordance with FIG. 3b.

EXAMPLE 3b
Producing Platelets Having Cholesteric Structure (Pigments) from a Lamina Pack Having 1508 Layers Using a Siliconized Cover Sheet The same procedure is followed as in Example 3a, except that the spacing between knife edge and roller is set to 1 μm and an LC film having a thickness of 1 μm is applied by blade application. Smoothing and crosslinking are carried out in a manner similar to that of Example 3a. After each rotation of the roller, the knife spacing is increased by 1 μm, so that a further 1 μm layer can be applied to the existing LC layer. This coating operation is performed 1508 times, resulting in a multilayer lamina pack of uniform color. The roll perimeter rotates with a velocity of 12.5 cm/sec. The cylindrical lamina pack consisting of 1508 layers having thicknesses of 1 μm is incised parallel to the roll axis and can be lifted off as a thick, free-standing lamina pack. The lamina pack is cut into narrow strips by a paper cutter and is subjected to size reduction by means of a Rotoplex shredder 20/12 (from Hosakawa Alpine Augsburg) fitted with a screen <0.8 mm, to <0.8 mm. Size reduction to produce pigments was carried out in a jet grinder AFG (from Hosokawa Alpine Augsburg). The particle size histogram, determined by means of a Mastersizer (Malvern Instruments Ltd., Malvern, UK) shows a mean particle size of 25.6 μm. Visual assessment in a microscope shows platelet-shaped particles. A scanning electron micrograph (FIG. 11) on the bed of the grinding stock shows uniform thicknesses of 1 μm. The spectrophotometric determination of the reflectance band yields uniform values for the individual pigment particles. This determination was carried out by means of a Zeiss microscope spectrometer MPM 400.

EXAMPLE 4
Producing Platelets by Continuous Coating of a Hard-Chromium Roller with 158 Layers A similar procedure is followed as in Example 3, except that a crosslinkable, liquid-crystalline material having a chiral phase, disclosed by Example 3b of DE 42 40 743 (corresponding to U.S. Pat. No. 5,362,315) is used. This affords a lamina pack consisting of 158 layers having a thickness of 5 μm. After incision transverse to the roller, large chips are lifted off by means of a scraper lying against the roller, without any residual coating remaining behind on the roller. The 5 μm layers are subjected to size reduction in a procedure similar to that of Example 1. Red pigments are obtained. A visual assessment in a microscope shows platelet-shaped particles. Scanning electron micrographs of a bed of these ground particles show uniformly single-layer pigments having thicknesses of 5 μm.

Comparative Example 1
Producing Platelets Having Cholesteric Structure (Pigments) of Only One Layer Comparative Example 1a The same procedure is followed as in Example 1a, except that a single layer of about 6 μm is prepared from the green LC mixture. After the cover sheet has been removed, the LC single layer having a thickness of 6 μm is broken up by the substrate sheet being deflected across a breaking edge (deflection radius 0.4 mm). The raw chips thus formed cannot, however, unlike those of Examples 1a–e, removed from the substrate sheet by suction only. Via the procedure described in Example 1, less than 5% of the LC film can be stripped off the substrate sheet. Only by using powerful compressed-air nozzles is it possible to achieve stripping rates of 90–95% even with this prior art single-layer method. This requires compressed-air pressures of about 4 bar with a nozzle diameter of 1.5 mm and a nozzle distance of about 2 cm. Complete stripping without any residues, as with the double layers described, is impossible, however, even by means of compressed air. The raw chips obtained are subjected to size reduction in an ultra-centrifugal mill of type ZM 100 from Retsch with a fitted screen <80 μm to produce pigments.

Comparative Example 1b

According to the procedure described in Comparative Example 1a, the green LC mixture described in Example 1a is used to prepare a liquid-crystal film whose layer thickness, however, is only 4–5 μm. As a result of the reduction in layer thickness, the LC single layers after removal of the cover sheet can no longer be broken up by deflecting the substrate sheet across a breaking edge having a deflection radius of 0.4 mm. Even if the deflection radius is reduced considerably, to about 0.1 mm, the best that can be achieved are isolated cracks in the coating. Moreover, the use of such a sharp breaking edge results in distinct damage to the substrate sheet, entailing its possible rupture. The LC film having a thickness of only 4–5 μm, which over large distances is only incompletely fractured, cannot be removed from the substrate sheet by means of the compressed-air nozzle described in Comparative Example 1a even by employing compressed-air at yet again increased compressed-air pressures of 7–8 bar. Even in the vicinity of existing cracks, no delamination whatsoever of the LC film can be observed.

EXAMPLE 6
Characteristic Profile of the Pigments Reduced Via the Multilayer Method The liquid-crystal pigments obtained according to Examples 1b, 1c, 3 and 4 and Comparative Example 1a are mixed with a clear coating in a ratio of 1:9 parts by weight, the clear coating used being a conventional acrylate-melamine resin-binder system from Herberts, Wuppertal, for automotive repair painting, and a water-based coating (Envirobase T 490 from PPG).

Neither during incorporation of the pigments into the coating systems nor in the rheology of the pigmented coatings, whether applied by spraying or blade coating, were any differences in handling observed between the pigments produced via the method according to the invention and the pigments from Comparative Example 1a.

The experimental values listed in the following table were determined in accordance with DE 199 17 067 (U.S. Ser. No. 09/546040), Example 11.

| Example | 1b | 1c | 0.1 | 3b | 4 | Comp. Ex. 1a |
|---|---|---|---|---|---|---|
| Crosslinking temperature (° C.) | 100 | 100 | 100 | 100 | 100 | 100 |
| Mesh fraction (μm) | 80 | 80 | 80 | 26** | 80 | 80 |
| RW* in water (nm) | 505 | 517 | 488 | 496 | 620 | 529 |

-continued

| Example | 1b | 1c | 0.1 | 3b | 4 | Comp. Ex. 1a |
|---|---|---|---|---|---|---|
| Δ RW* after 48 h in toluene (nm) | 38 | 36 | 34 | | 140 | 38 |
| Half-width of reflectance band (nm) | 74 | 76 | 76 | 100 | 108 | 76 |
| Reflectance (%) | 31 | 28 | 29 | 21 | 19 | 29 |

*Reflectance Wavelength
**mean grain diameter after jet-grinding

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" mean "one or more" unless specified otherwise.

What is claimed is:

1. In a method of producing platelets, wherein a material to be processed into platelets is applied in a flowable or gaseous state to a substrate, is consolidated, removed from the substrate and subjected to a crushing or grinding process, the improvement comprising applying one or a plurality of materials in succeeding layers to said substrate to prepare a lamina pack which in cross section perpendicular to its surface, contains a plurality of individual, separable laminae of a thickness of between 0.2–1000 μm, stripping said lamina pack from the substrate, disintegrating said lamina pack into individual laminae, and reducing the individual laminae in size to a mean particle size of 0.5–10,000 μm.

2. The method of claim 1, wherein the lamina pack is prepared by applying and consolidating the material to be processed three or more times.

3. The method of claim 1, wherein the material to be processed comprises polymerizable and/or crosslinkable liquid-crystalline, optionally cholesteric, materials.

4. The method of claim 1 wherein at least one of said separable laminae comprises a plurality of non-separable layers.

5. The method of claim 1, wherein the material to be processed into platelets comprises at least one material selected from the group consisting of polyesters, epoxy resins, vinyl esters, vinyl ethers, polyurethanes, silanes, siloxanes, silanolates, water glass, silicic acid esters, liquid-crystalline polymerizable and/or crosslinkable aromatic, cycloaliphatic or heterocyclic compounds, film-forming dispersions, resin solutions, suspensions, powder paints, substances which can be applied by sputtering or vapor deposition, polymerizable substances, polyaddable substances, hydrosilylable substances, polycondensable substances, crosslinkable substances, fusible resins, thermoplasts, solutions which can be converted into films by the evaporation of solvents, suspensions, compositions which can be converted into two-phase systems by polymerization, and mixtures thereof.

6. The method of claim 1, wherein the lamina pack is prepared by repeated application of one or more materials to be processed into platelets onto a substrate in the form of a sheet without a release agent or release layer.

7. The method of claim 1, wherein the lamina pack is prepared by application of the material to be processed into platelets onto a substrate in the form of a rotating cylinder and is released in the form of a roll-shaped or an annular lamina pack.

8. The method as claimed in claim 7, wherein the material to be processed into platelets is first applied to a revolving belt and is then transferred to said rotating cylinder, so that a lamina pack in the form of a roll is produced on the cylinder.

9. The method as claimed in claim 7, wherein the material to be processed into platelets is applied to the inside of said rotating cylinder, such that a lamina pack in the form of a roll-shaped or an annular lamina pack is produced on the inside of the cylinder.

10. The method of claim 1, wherein the lamina pack is produced continuously by an applicator mechanism revolving in a circular orbit and the lamina pack takes the form of a helix.

11. The method of claim 1, wherein the lamina pack is produced continuously by an applicator mechanism moving back and forth in a plane and the lamina pack takes the form of a folded-leaf structure.

12. The method of claim 1, wherein the lamina pack is produced with the use of a release agent.

13. The method of claim 1, wherein at least one of said laminae is produced in the presence of an auxiliary which aligns liquid crystals, or in the presence of an electric or magnetic field.

14. The method of claim 1, wherein the lamina packs are produced with the use of smoothing elements.

15. The method of claim 1, wherein laminae are continuously removed from the lamina pack on the side opposite an applicator mechanism.

16. The method of claim 1, wherein size reduction of the laminae is carried out in an edge mill, a ball mill, a pin mill or an air-jet mill, and the material is then classified.

17. The method of claim 1, wherein materials having different characteristics are applied on top of one another immediately after one another to form a multiple layer laminate, with the proviso that the layers of said multiple layer laminate are bonded firmly together and represent individual laminae of the lamina pack being formed which, during the grinding process, form platelets having a desired laminar sequence.

* * * * *